US007134174B1

(12) United States Patent
Andrade

(10) Patent No.: US 7,134,174 B1
(45) Date of Patent: Nov. 14, 2006

(54) DRUM RING REMOVAL/INSTALLATION TOOL

(75) Inventor: William Andrew Andrade, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 11/118,300

(22) Filed: Apr. 29, 2005

(51) Int. Cl.
*B23P 19/02* (2006.01)

(52) U.S. Cl. .......................................... 29/225; 29/278

(58) Field of Classification Search .................. 29/225, 29/242–243, 270, 280, 282; 81/63.1, 58.4, 81/61, 62
See application file for complete search history.

(56) References Cited

U.S. PATENT DOCUMENTS 2,733,456 A * 2/1956 Howell .......................... 7/100
3,800,634 A 4/1974 Clayton
4,079,657 A 3/1978 Sobreira
4,334,445 A * 6/1982 Timewell ................... 81/177.1
4,528,735 A * 7/1985 Eastridge et al. .......... 29/221.5
5,087,133 A 2/1992 Jacob et al.
5,469,614 A 11/1995 Lyonnais
5,503,701 A 4/1996 Seick et al.
5,625,943 A 5/1997 Lyonnais
6,145,413 A * 11/2000 Lin ........................... 81/63.1

* cited by examiner

*Primary Examiner*—Lee D. Wilson
(74) *Attorney, Agent, or Firm*—James S. Tak; Alan H. Thompson

(57) ABSTRACT

A handheld tool, or a pair of such tools, such as for use in removing/installing a bolt-type clamping ring on a container barrel/drum, where the clamping ring has a pair of clamping ends each with a throughbore. Each tool has an elongated handle and an elongated lever arm transversely connected to one end of the handle. The lever arm is capable of being inserted into the throughbore of a selected clamping end and leveraged with the handle to exert a first moment on the selected clamping end. Each tool also has a second lever arm, such as a socket with an open-ended slot, which is suspended alongside the first lever arm. The second lever arm is capable of engaging the selected clamping end and being leveraged with the handle to exert a second moment which is orthogonal to the first moment. In this manner, the first and second moments operate to hold the selected clamping end fixed relative to the tool so that the selected clamping end may be controlled with the handle. The pair of clamping ends may also be simultaneously and independently controlled with the use of two handles/tools so as to contort the geometry of the drum clamping ring and enable its removal/installation.

15 Claims, 6 Drawing Sheets

DRUM RING REMOVAL/INSTALLATION TOOL

The United States Government has rights in this invention pursuant to Contract No. W-7405-ENG-48 between the United States Department of Energy and the University of California for the operation of Lawrence Livermore National Laboratory.

FIELD OF THE INVENTION

The present invention relates to handheld tools, and more particularly to a handheld tool, or a pair of such tools, for removing/installing a bolt-type drum clamping ring on a container drum.

BACKGROUND OF THE INVENTION

Container drums and barrels are commonly known and widely used, such as for shipping, storage, etc. They typically have a rigid cylindrical construction, such as steel, and come in a variety of sizes, such as for example 10 gallon to 55 gallon drums. Open headed drums include a top cover/lid which is cable of being secured to the upper rim of the drum using a drum clamping ring, also typically constructed from a high strength material, such as steel. One commonly used type of drum clamping ring is a bolt-type drum clamping ring shown at reference character 30 in FIGS. 3, 4, and 8 having an annular band 31 with a preferably arcuate cross-section, which terminates at a pair of adjacent clamping ends 32 and 33. As shown in FIG. 3, each clamping end 32, 33 is a lug or flange extending from the annular band 31 and having respective throughbores 34, 35. The throughbores are alignable with each other, preferably along an axis tangential to the annular band, for receiving a clamping bolt, such as 52 shown in FIG. 8. The clamping bolt 52, together with a nut 53, is used to draw the clamping ends 32, 33 together for constricting the annular band 31 and thereby securing the drum cover 36 on the drum 50. When removing the drum clamping ring from a drum, the clamping bolt is first released and removed from the throughbores of the clamping ends. As can be seen between FIGS. 8 and 9, the removal of the clamping bolt typically increases the gap width of the drum clamping ring, such as from 70 in FIG. 8, to 70' in FIG. 9. However, the increase in gap width alone is typically insufficient to then enable removal of the clamping ring.

Therefore, once the clamping bolt is removed, mechanical assistance is typically required to manually remove the bolt-type drum clamping ring from the drum. One common practice has been to use an elongated bar, such as the long shank of a screwdriver, by inserting the bar through one of the throughbores and leveraging the bar to manipulate/control the clamping end. While this makeshift practice provides a crude solution for assisting in the removal or installation of a drum clamping ring, it has been known to be awkward and clumsy with an increased risk of injury to a user and damage to the clamping ring. Screwdriver shanks, for example, are typically much narrower than the throughbore diameters such as to produce play and cause slippage and possible injury to a user. There is therefore a need for a simple tool to assist in the removal and/or installation of bolt-type drum clamping rings on container drums and barrels safely and easily with little risk of injury to a user.

SUMMARY OF THE INVENTION

Generally, the present invention is directed to a simple handheld tool for releasably engaging an article or workpiece having a throughbore so as to control and manipulate the spatial position and orientation of the article or workpiece with a handle of the tool. Moreover, a pair of such handheld tools may be used as a tool system to separately and simultaneously engage and control a pair of such articles or workpieces independent of each other, which if structurally connected to each other can contort the geometry of the connecting structure.

The tool and tool system of the present invention may be used in particular to remove/install a bolt-type drum clamping ring on a container drum or barrel, the clamping ring of a type having an annular band and a pair of clamping ends each with a throughbore, as describe in the Background. Generally, each tool has an elongated handle, an elongated lever arm which is transversely connected to one end of the handle, and a second lever arm, such as a socket with an open-ended slot, which is fixedly suspended alongside the elongated lever arm. Both the elongated lever arm and the second lever arm are capable of releasably engaging one of the clamping ends and being leveraged by the handle to exert first and second orthogonal moments on the clamping end. And the first and second moments operate to hold the clamping end fixed relative to the tool so that the clamping end may be controlled with the handle. When a pair of clamping ends is used to engage both clamping ends, the clamping ends are simultaneously and independently controllable so as to contort the geometry of the drum clamping ring and enable its removal/installation.

One aspect of the present invention includes tool comprising: an elongated lever handle; an elongated lever arm transversely extending from one end of the handle to a free end; and a socket surrounding the lever arm to define a socket cavity therebetween, said socket having an open end adjacent the free end leading into the socket cavity and an open-ended slot in communication with the open end.

Another aspect of the present invention includes a tool system comprising: a pair of tools, each comprising: an elongated lever handle; an elongated lever arm transversely extending from one end of the handle to a free end; and a socket surrounding the lever arm to define a socket cavity therebetween, said socket having an open end adjacent the free end leading into the socket cavity and an open-ended slot in communication with the open end.

Another aspect of the present invention includes a handheld tool for removing/installing a drum clamping ring on a drum, said drum clamping ring of a type having a pair of clamping ends each with a throughbore, said tool comprising: an elongated lever handle; an elongated lever arm transversely connected to one end of the handle and extending to a free end, said lever arm adapted to be inserted into the throughbore of a selected one of the clamping ends and leveraged by the handle in a plane defined therewith to exert a corresponding first moment on the selected clamping end; and a socket surrounding the lever arm to define a socket cavity therebetween, said socket having an open end adjacent the free end leading into the socket cavity, and an open-ended slot in communication with the open end for catching a neck portion of the selected clamping end when inserting the lever arm in the throughbore, said socket adapted to be leveraged by the handle about a longitudinal axis of the lever arm to abut against the neck portion of the selected clamping end so that a corresponding second moment is exerted thereon orthogonal to the first moment, wherein the first and second moments together hold the selected clamping end fixed relative to the tool so that the selected clamping end is controllable with the handle.

Another aspect of the present invention includes a tool system for removing/installing a drum clamping ring on a drum, said drum clamping ring of a type having a pair of clamping ends each with a throughbore, said tool system comprising: a pair of handheld tools, each tool comprising: an elongated lever handle; an elongated lever arm transversely connected to one end of the handle and extending to a free end, said lever arm adapted to be inserted into the throughbore of a selected one of the clamping ends and leveraged by the handle in a plane defined therewith to exert a corresponding first moment on the selected clamping end; and a socket surrounding the lever arm to define a socket cavity therebetween, said socket having an open end adjacent the free end leading into the socket cavity, and an open-ended slot in communication with the open end for catching a neck portion of the selected clamping end when inserting the lever arm in the throughbore, said socket adapted to be leveraged by the handle about a longitudinal axis of the lever arm to abut against the neck portion of the selected clamping end so that a corresponding second moment is exerted thereon orthogonal to the first moment, wherein the first and second moments together hold the selected clamping end fixed relative to the tool so that the selected clamping end is controllable with the handle, and the pair of clamping ends are simultaneously and independently controllable with the two handles, for contorting the geometry of the drum clamping ring and enabling removal/installation thereof on the drum.

Another aspect of the present invention includes a handheld tool for controlling an article having a throughbore, comprising: an elongated lever handle; an elongated first lever arm transversely extending from one end of the handle to a free end, said first lever arm adapted to be inserted into the throughbore of the article and leveraged by the handle in a plane defined therewith so that a corresponding first moment is exerted on the article; and means for limiting rotation of the first lever arm in the throughbore of the article so that turning the handle about a longitudinal axis of the first lever arm exerts a corresponding second moment on the article orthogonal to the first moment, wherein the first and second moments together hold the article fixed relative to the tool so that the article is controllable with the handle.

Another aspect of the present invention includes a tool system for controlling a pair of articles each having a throughbore, said tool system comprising: a pair of handheld tools, each tool comprising: an elongated lever handle; an elongated first lever arm transversely extending from one end of the handle to a free end, said first lever arm adapted to be inserted into the throughbore of a selected one of said articles and leveraged by the handle in a plane defined therewith so that a corresponding first moment is exerted on the selected article; and means for limiting rotation of the first lever arm in the throughbore of the selected article so that turning the handle about a longitudinal axis of the first lever arm exerts a corresponding second moment on the selected article orthogonal to the first moment, wherein the first and second moments together hold the selected article fixed relative to the tool so that the selected article is controllable with the handle, and the pair of articles are simultaneously and independently controllable with the two handles.

BRIEF DESCRIPTION OF THE DRAWINGS

The accompanying drawings, which are incorporated into and form a part of the disclosure, are as follows.

DETAILED DESCRIPTION

Figure 1:
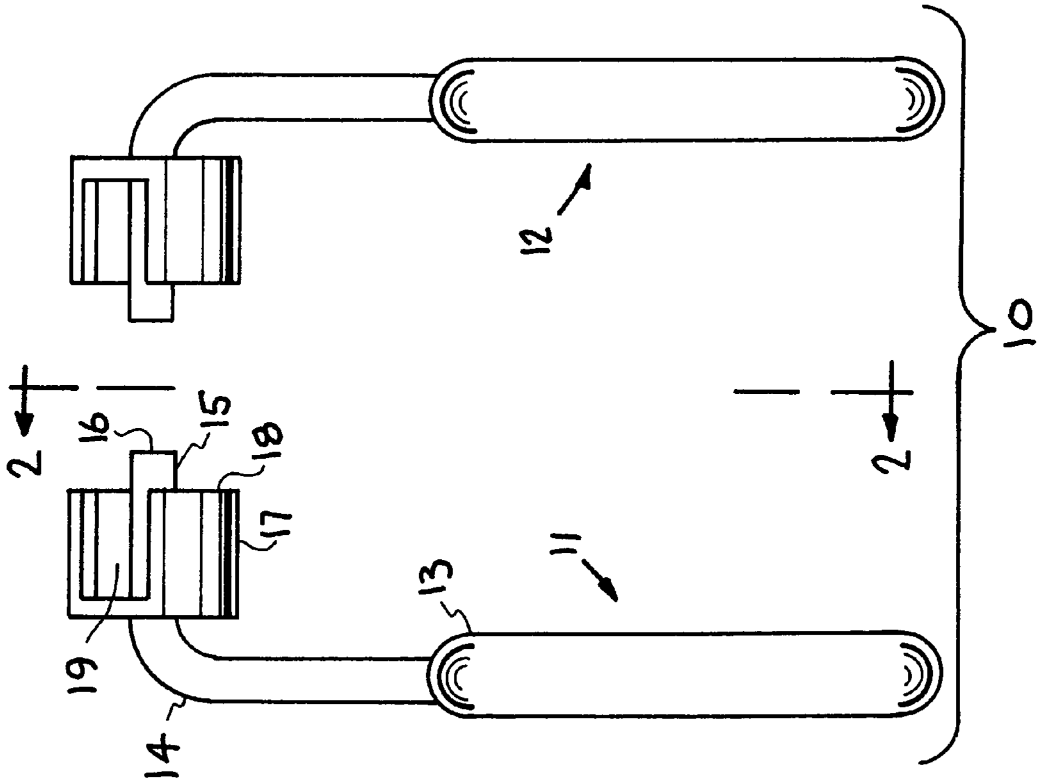
FIG. 1 is a plan view of a first exemplary embodiment of a tool system of the present invention comprising a pair of handheld tools.
Figure 10:
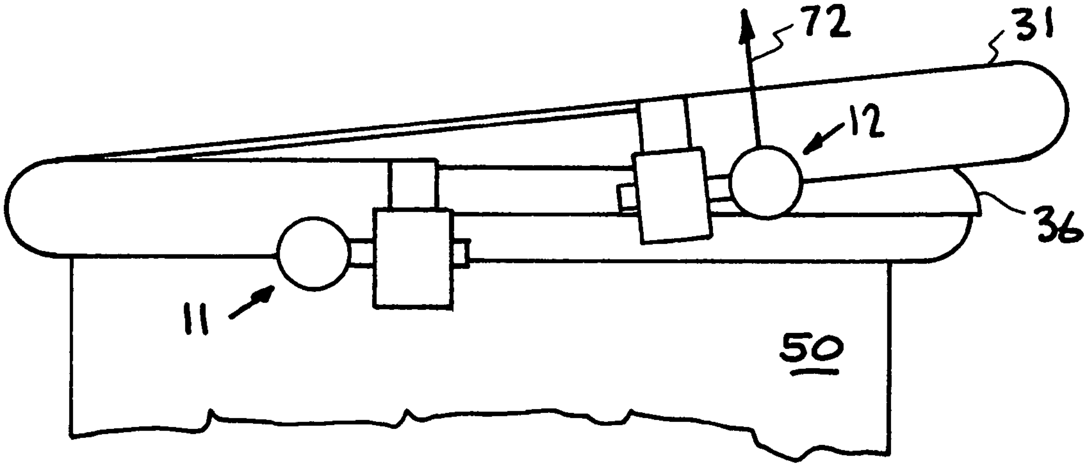
FIG. 10 is side view following FIG. 9 showing contortion of the geometry of the drum clamping ring when the clamping ends are manipulated using the pair of tools of the present invention.

Turning now to the drawings, FIG. 1 shows a pair of handheld tools of the present invention, generally indicated at reference character 10, and individually referenced at 11 and 12. Both tools are substantially identical, except that they may be preferably configured as mirror images of each other for left hand and right hand use, as shown in FIG. 10. As such, it is appreciated that the characteristic features and operation of one of the tools in the pair, e.g. 11, is also generally illustrative of and applicable to the other one of the pair, i.e. tool 12. Similarly, since the present invention includes both a single tool embodiment and a tool system embodiment having an independent pair of such tools, the operation of a single tool is, except where noted, generally illustrative of and applicable to the operation of the pair. In addition, three or more tools of the present invention may also be utilized in robotic, machine or otherwise automated operations and applications to realize the mechanical advantage provided by each tool without the physical limitation of having only two hands. Furthermore, it is appreciated that while the following discussion focuses on the use of the tool(s) for releasably engaging clamping ends with throughbores of a bolt-type drum clamping ring to remove/install on container drums, it is equally applicable generally to any article/workpiece(s) having a throughbore capable of being engaged, for controlling its spatial position/orientation.

Figure 2:
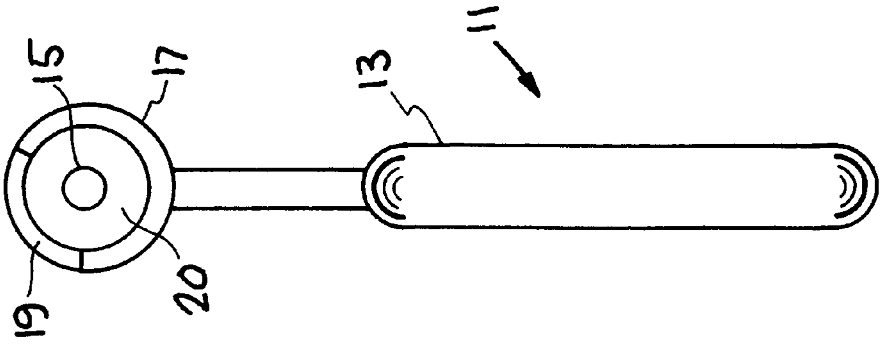
FIG. 2 is a cross-sectional view taken along line 2 of FIG. 1 of one of the tools.
Figure 3:
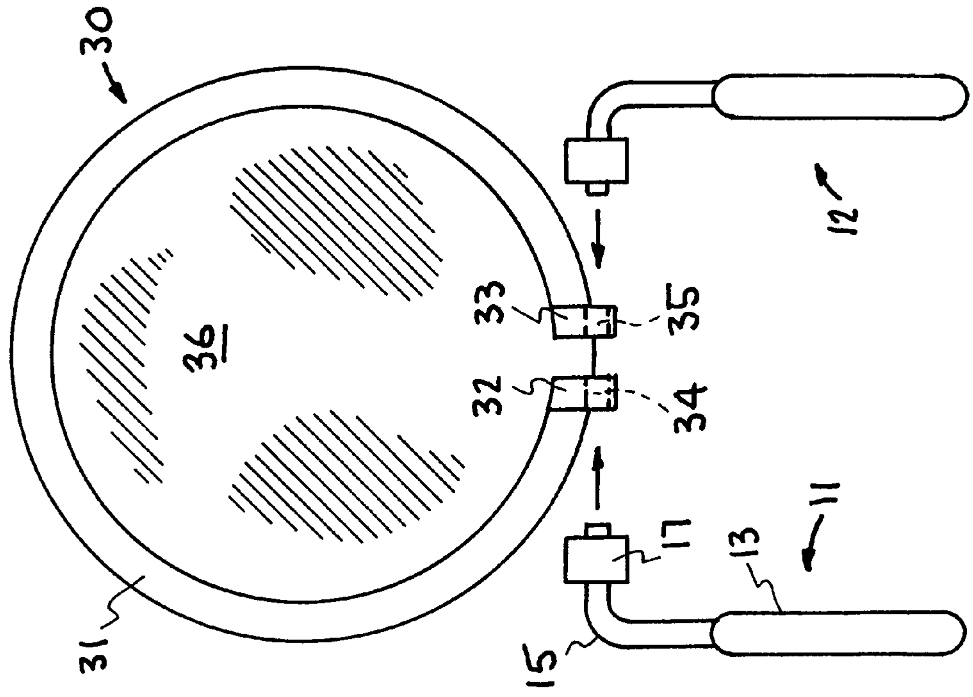
FIG. 3 is a top view of the tool system of FIG. 1 in relation to a bolt-type drum clamping ring prior to engagement.

As shown in FIGS. 1 and 2, tool 11 has an elongated handle 13, an elongated lever arm 15, and a socket 17 having a open-ended slot 19, and is constructed from a suitably rigid material, such as steel. In particular, the lever arm 15 is connected in a transverse direction, e.g. 90 degrees, to one end of the handle 13, and extends to a free end 16. Preferably, the lever arm 15 is integrally connected to the lever handle 13, such as at an elbow 14, and preferably has a cylindrical configuration dimensioned to conform and be easily inserted into the cylindrical cavity of a throughbore of a clamping end, such as shown in FIG. 3. And the socket 17 is fixedly connected to and surrounds the lever arm 15 to define a socket cavity 20 therebetween, as best seen in FIG. 2. The socket 17 also has an open end 18 adjacent the free end 16 of the lever arm 15 leading into the socket cavity 20, with the open-ended slot 19 in communication with the open end 18. The socket 17 in FIGS. 1 and 2 is particularly shown coaxially surrounding the lever arm 15, but may be arranged in the alternative to particularly conform to and suit the unique structure of a given clamping end and throughbore. As shown in FIG. 1, the free end 16 preferably extends beyond the open end 18 of the socket 17, so that locating and inserting the free end 16 into a throughbore of a clamping end (not shown) may be facilitated.

Figure 4:
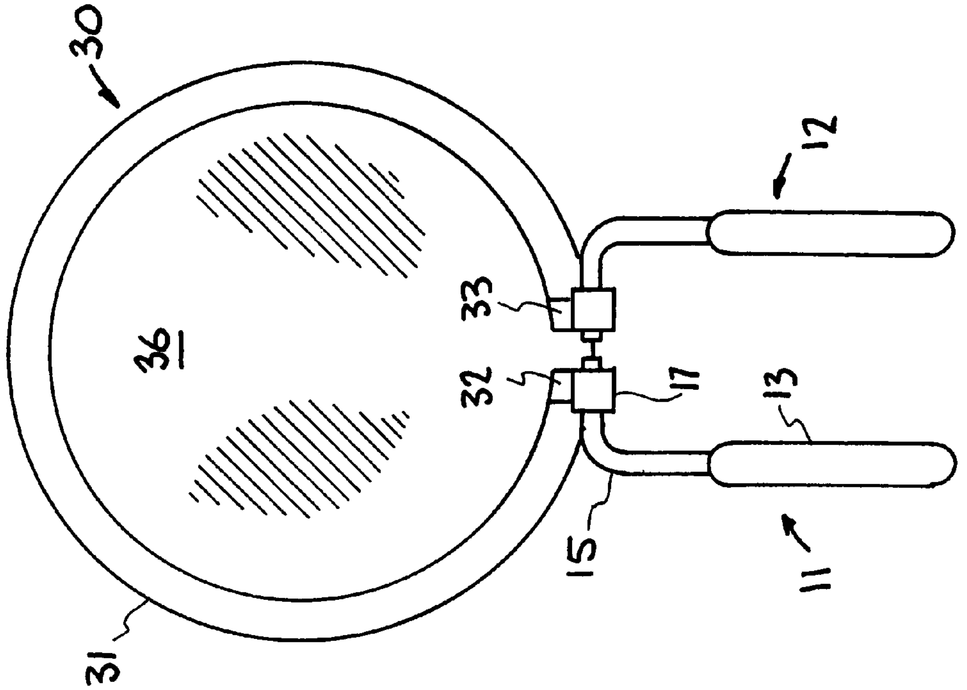
FIG. 4 is a top view of the tool system of FIG. 3 upon engaging the bolt-type drum clamping ring.

The releasable engagement of the pair of tools, 11 and 12 to a pair of clamping ends 32, 33, is shown in FIGS. 3 and 4, showing a top view of a bolt-type drum clamping ring 30 with the clamping bolt (not shown) removed. In particular, FIG. 3 shows the orientation and alignment of the tools 11, 12 necessary to insert the lever arms in the respective throughbores, and FIG. 4 shows the engaged combination. As shown in FIG. 3, the respective lever arms of the tools 11 and 12 are coaxially aligned with a corresponding one of the throughbores 34, 35, and inserted in the direction of the arrows. It is notable that insertion/engagement of a tool is preferably a single step involving a translation of the tool, which is due to the parallel orientation of the lever arms with the respective open-ended slots (see FIGS. 1 and 2). It is further notable that the lever handles (e.g. 13) of both tools remain aligned and parallel with each other, and generally point in the direction of a user (not shown), both prior to, during, and after insertion/engagement. It is appreciated that this parallel, pointing-towards-user, engaged orientation of the handles (when used as a pair in a tool system) enables symmetric and ergonomic handling of the tools by counterbalancing the pair of tools against each other when simultaneously actuated. While the insertion directions shown in FIGS. 3 and 4 show the tools 11, 12 approaching each other, each of the tools may be alternatively inserted in the opposite direction away from each other. Of course the clamping ends must be suitably separated from each other to allow for such reverse insertion.

Figure 5:
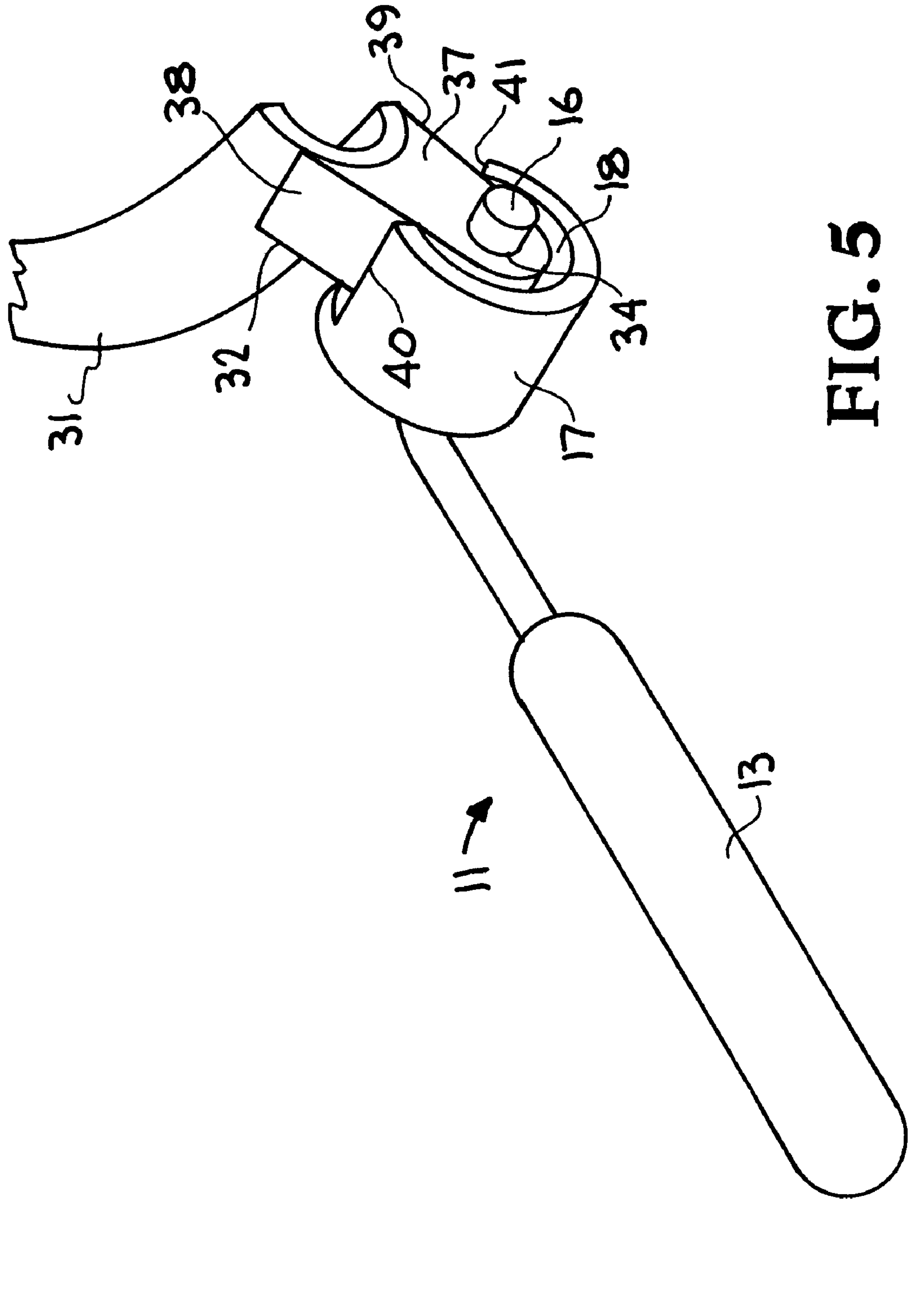
FIG. 5 is an enlarged perspective view of the tool of FIG. 2 engaged with a clamping end of a drum clamping ring.
Figure 6:
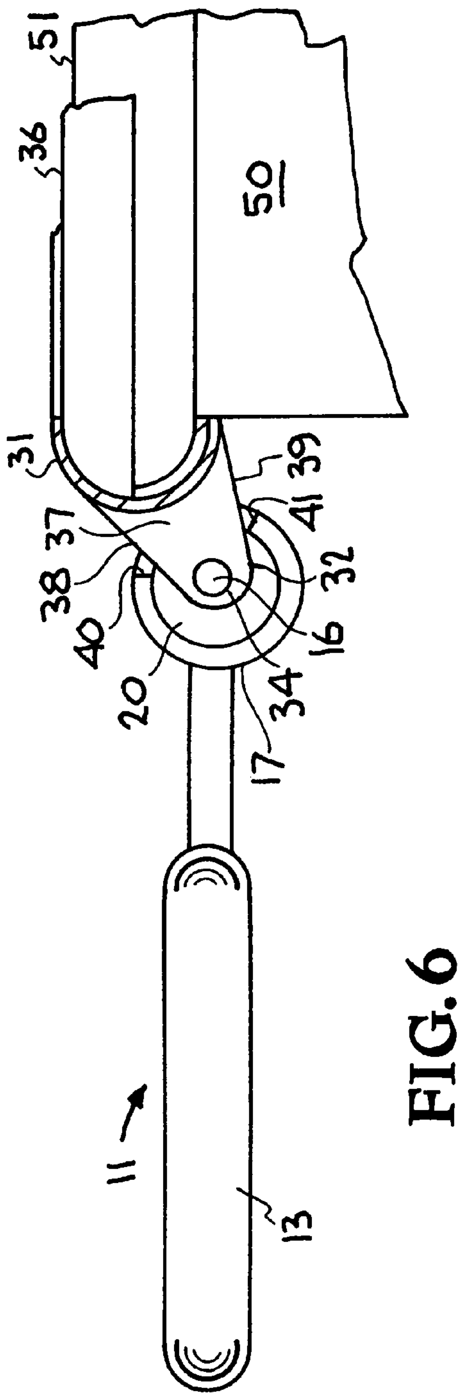
FIG. 6 is a side view of the engaged tool of FIG. 5.

FIGS. 5 and 6 show enlarged perspective and side views, respectively, of the tool 11 of FIG. 4 after being insertably engaged with a clamping end 32. The clamping end 32 surrounds and defines the throughbore 34, and has a neck portion 37 extending between the throughbore 34 and the annular band 31. The neck portion 37 may be characterized as connecting the clamping end 32 to a corresponding terminus of the annular portion 31. The open-ended slot of the socket 17 is suitably dimensioned to approximate the thickness of the neck portion 37 so as to receive and catch the neck portion simultaneously with the insertion of the lever arm into the throughbore, with the catch engagement limiting rotation of the lever arm while in the throughbore. In particular, the open-ended slot includes a first slot edge 40 positionable adjacent an upper surface 38 of the neck portion 37, and an opposite second slot edge 41 positionable adjacent a lower surface 39 of the neck portion 37. Preferably, the open-ended slot is suitably dimensioned to receive the neck portion 37 with little play, with the first slot edge 40 confronting the upper surface 38, and the second slot edge 41 confronting the lower surface 39. It is appreciated, however, that close tolerances between the slot edges and the respective upper and lower surfaces of the neck portion may cause difficulty when attempting to align and locate the neck portion to the slot for insertion. To address this, the opposing slot edges may be suitably spaced from each other (not shown) to provide a sufficient margin of clearance for easy entry of the neck portion.

Figure 7:
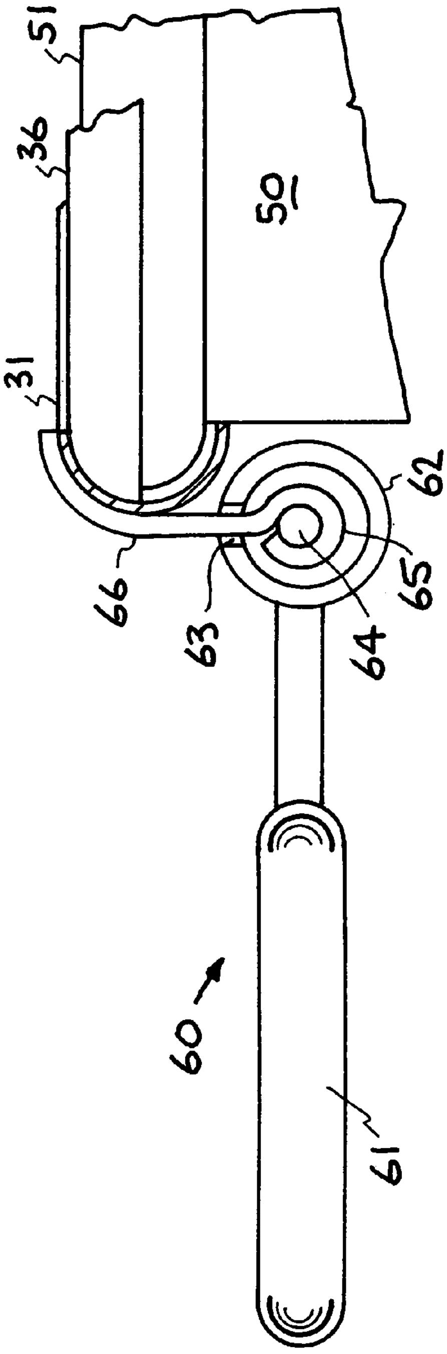
FIG. 7 is a side view of a second exemplary embodiment of a tool of the present invention having a narrow open slot substantially conforming to a relatively thin neck portion of an alternative clamping end configuration.
Figure 8:
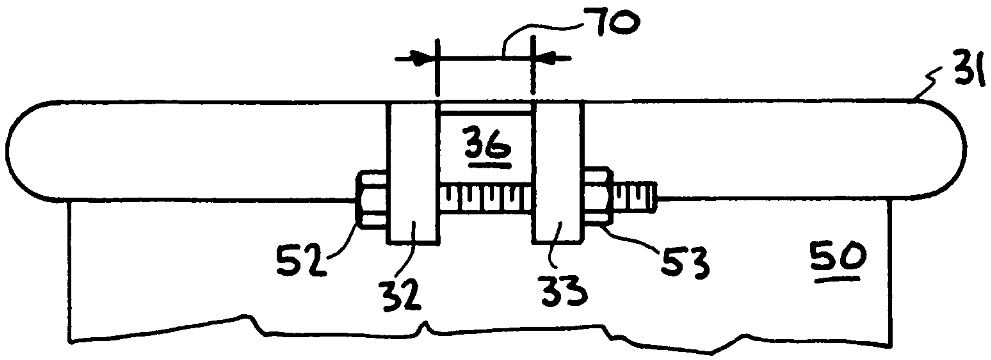
FIG. 8 (PRIOR ART)
FIG. 8 is a side view of a bolt-type drum clamping ring known in the prior art shown clamped down with a bolt on the upper rim of a drum.

And FIG. 7 shows an alternative embodiment of a tool 60 of the present invention, similar to tool 11 of FIG. 6. FIG. 7 shows an alternative design of a bolt-type drum ring assembly, having a clamping end 65 connected to an annular portion 31 via a thin neck portion 66 extending vertically downward from the annular portion 31. The tool 60 includes a lever handle 61 with a transverse lever arm 64, shown inserted in the throughbore of the clamping end 65, and a socket 62 having a narrow open-ended slot 63 substantially conforming to the narrow thickness of the neck portion 66.

Figure 9:
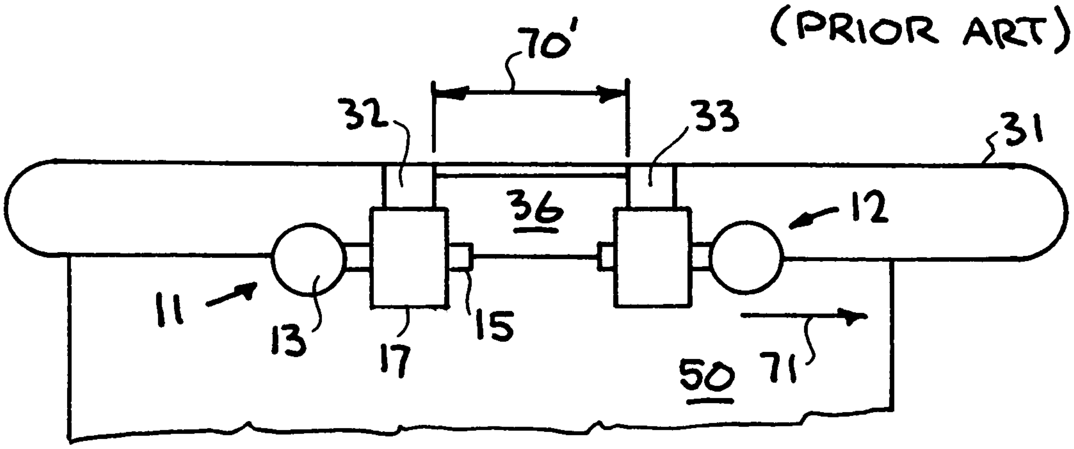
FIG. 9 is a side view of the bolt-type drum clamping ring of FIG. 8 with the clamping bolt/nut removed, and the pair of handheld tools of the present invention engaging the pair of clamping ends.

As shown in FIGS. 9 and 10, once the tools 11, 12 are releaseably engaged to a corresponding clamping end, 32, 33 via an associated throughbore, the handle of each tool may be controlled by a user (not shown) to leverage the elongated lever arm and socket, respectively. In particular, the lever handle functions to receive an input leveraging force from a user, and each of the elongated lever arm (e.g. 15) and socket (e.g. 17) functions to transmit the input leverage force to the clamping end (e.g. 32) about a corresponding fulcrum axis. For the lever arm, the fulcrum axis is located at or near the elbow and normal to a leverage plane defined by the lever arm and handle. And for the socket, the fulcrum axis is coaxial with the longitudinal axis of the lever arm, and therefore orthogonal with the fulcrum axis of the lever arm. In either case, a moment is produced along the respective orthogonal fulcrum axis, with the rotational direction of the moment determined by the actuating direction of the handle.

With respect to the lever arm in particular, the selected direction of rotation of the elongated lever handle 13 will determine whether the diameter of the annular portion 31 of the clamping ring is increased or decreased. For example, pulling the handle of tool 12 in FIG. 9 in the direction of arrow 71 will produce a moment on clamping end 33 having a tendency to increase the gap 70' and consequently increase the diameter of the annular portion 31 of the drum clamping ring.

With respect to the socket, such as 17, the selected rotational direction of the elongated lever handle 13 will determine whether the first slot edge abuts against the upper surface of the neck portion, or the second slot edge abuts against the lower surface of the neck portion, to determine the rotational direction of the exerted moment. For example, pulling the handle of tool 12 in FIG. 10 in the direction of arrow 72 will abut the first slot edge against the upper surface of the neck portion to produce a moment on clamping end 33 having a tendency to twist and raise the annular portion 31. Due to the different moments created by different parts of the socket, the socket may be characterized as an integrated pair of lever arms fixedly suspended alongside the elongated lever arm and adapted to be selectively leveraged by the handle about the longitudinal axis of the elongated lever arm to stop against either the upper surface or lower surface of the neck portion of the clamping end. The open-ended slot of the socket may also be characterized as having an upper jaw (associated with the first edge 40) and a lower jaw (associated with the opposite second edge 41), because when leveraged by the handle in a first direction, the upper jaw is caused to bite or stop against the upper surface of the neck portion, and when rotated in an opposite direction, the lower jaw is caused to bite or stop against the lower surface of the neck portion.

As shown in FIG. 10, simultaneously leveraging the lever handle of a tool, such as 12, about both the orthogonal fulcrum axes will produce the two orthogonal moments which together hold the clamping end, such as 33, fixed relative to the tool. When fixed in this manner, the spatial position and orientation of the clamping end is cable of being controlled with the lever handle. Moreover, when the clamping ends 32 and 33 are connected, such as by the annular portion 31 of the drum clamping ring, the drum clamping ring may be geometrically contorted by independently controlling the clamping ends, including increasing or decreasing the diameter of the drum clamping ring.

As shown in FIG. 10, the tool 11 is engaged and operated to keep the clamping end 32 stationary while the other clamping end 33 is spatially manipulated by tool 12. It is appreciated, however, that a single tool of the present invention may be used in the alternative to hold fixed one of the clamping ends, while the other clamping end may be left alone, or otherwise held stationary by some other means, such as by using a second conventional tool.

Figure 11:
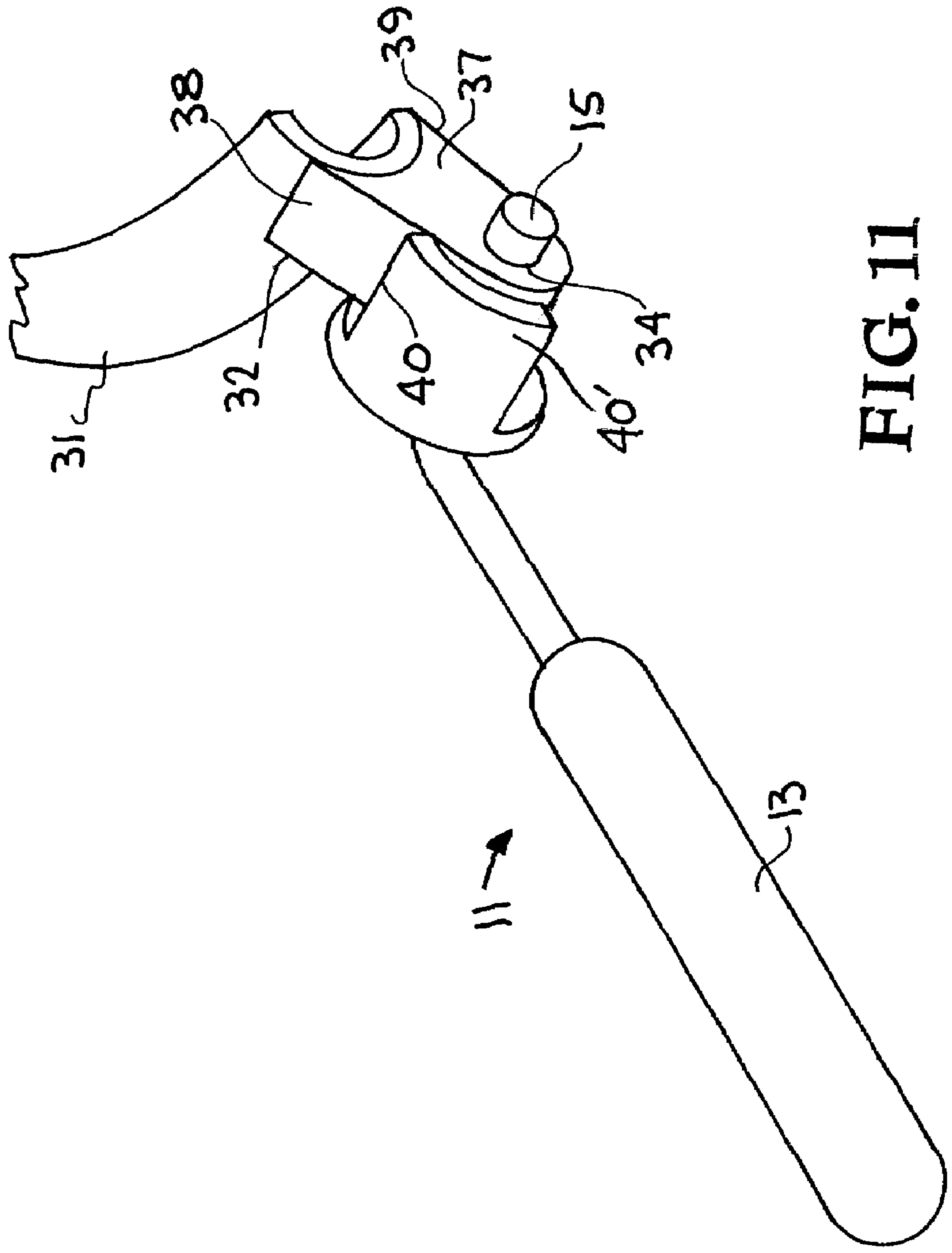
FIG. 11 is an enlarged perspective view of an exemplary embodiment of the present invention having a single upper jaw/lever arm 40' for exerting a moment in only one direction about the longitudinal axis of the elongated lever arm 15.

It is also appreciated that where a pair of tools is provided for use as a tool system, each of the tools may be particularly configured for left hand use and right hand use. Furthermore, each of the tools may be preferably configured to be operable when rotated in a predetermined direction, such as opposite directions to each other. One example of such an operation can be provided by a pair of tools each with an elongated lever arm, but with one tool (e.g. for left hand) having only a first slot edge/upper jaw, and the other tool (e.g. for right hand) having only a second slot edge/lower jaw. FIG. 11 shows an exemplary left hand tool of such a pair of tools having only the upper jaw (i.e. lever arm) 40' which is parallel to the elongated first lever arm 15. In particular, FIG. 11 shows the upper jaw/lever arm 40' abutting against the upper surface 38 of the neck portion 37 so that a moment may only be exerted by lifting up on the handle 13. This arrangement would enable a pair of clamping ends to be pried/pulled apart in opposite vertical and horizontal directions. Generally, where a pair of tools of the present invention is used in a tool system, the parallel, pointing-towards-user orientation of the handles enables symmetric and thus ergonomic, efficient and facilitated leveraging and actuation, by enabling the handles to counterbalance each other and produce zero-sum exertion of force on the drum clamping ring.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

I claim:

1. A tool comprising:

an elongated lever handle;

an elongated lever arm transversely extending from one end of the handle to a free end; and a socket surrounding the lever arm to define a socket cavity therebetween, said socket having an open end adjacent the free end leading into the socket cavity and an open-ended slot in communication with the open end.

2. A tool system comprising:

a pair of tools, each comprising:

an elongated lever handle;

an elongated lever arm transversely extending from one end of the handle to a free end; and a socket surrounding the lever arm to define a socket cavity therebetween, said socket having an open end adjacent the free end leading into the socket cavity and an open-ended slot in communication with the open end.

3. The tool system of claim 2, wherein said pair of tools are mirror images of each other.

4. A handheld tool for removing/installing a drum clamping ring on a drum, said drum clamping ring of a type having a pair of clamping ends each with a throughbore, said tool comprising:

an elongated lever handle;

an elongated lever arm transversely connected to one end of the handle and extending to a free end, said lever arm adapted to be inserted into the throughbore of a selected one of the clamping ends and leveraged by the handle in a plane defined therewith to exert a corresponding first moment on the selected clamping end; and a socket surrounding the lever arm to define a socket cavity therebetween, said socket having an open end adjacent the free end leading into the socket cavity, and an open-ended slot in communication with the open end for catching a neck portion of the selected clamping end when inserting the lever arm in the throughbore, said socket adapted to be leveraged by the handle about a longitudinal axis of the lever arm to abut against the neck portion of the selected clamping end so that a corresponding second moment is exerted thereon orthogonal to the first moment, wherein the first and second moments together hold the selected clamping end fixed relative to the tool so that the selected clamping end is controllable with the handle.

5. A tool system for removing/installing a drum clamping ring on a drum, said drum clamping ring of a type having a pair of clamping ends each with a throughbore, said tool system comprising:

a pair of handheld tools, each tool comprising:

an elongated lever handle;

an elongated lever arm transversely connected to one end of the handle and extending to a free end, said lever arm adapted to be inserted into the throughbore of a selected one of the clamping ends and leveraged by the handle in a plane defined therewith to exert a corresponding first moment on the selected clamping end; and a socket surrounding the lever arm to define a socket cavity therebetween, said socket having an open end adjacent the free end leading into the socket cavity, and an open-ended slot in communication with the open end for catching a neck portion of the selected clamping end when inserting the lever arm in the throughbore, said socket adapted to be leveraged by the handle about a longitudinal axis of the lever arm to abut against the neck portion of the selected clamping end so that a corresponding second moment is exerted thereon orthogonal to the first moment, wherein the first and second moments together hold the selected clamping end fixed relative to the tool so that the selected clamping end is controllable with the handle, and the pair of clamping ends are simultaneously and independently controllable with the two handles, for contorting the geometry of the drum clamping ring and enabling removal/installation thereof on the drum.

6. The tool system of claim 5, wherein said pair of handheld tools are mirror images of each other adapted for left hand and right hand use.

7. A handheld tool for controlling an article having a throughbore, comprising:

an elongated lever handle;

an elongated first lever arm transversely extending from one end of the handle to a free end, said first lever arm adapted to be inserted into the throughbore of the article and leveraged by the handle in a plane defined therewith so that a corresponding first moment is exerted on the article; and means for limiting rotation of the first lever arm in the throughbore of the article so that turning the handle about a longitudinal axis of the first lever arm exerts a corresponding second moment on the article orthogonal to the first moment, wherein the first and second moments together hold the article fixed relative to the tool so that the article is controllable with the handle.

8. The tool of claim 7, wherein said means for limiting rotation of the first lever arm in the throughbore of the article comprises a second lever arm fixedly suspended alongside the first lever arm and adapted to be leveraged by the handle about the longitudinal axis of the first lever arm to abut against and thereby exert the second moment on the article.

9. The tool of claim 8, wherein said means for limiting rotation of the first lever arm in the throughbore of the article further comprises a third lever arm fixedly suspended alongside the first lever arm and adapted to be leveraged by the handle about the longitudinal axis of the first lever arm to abut against the article at an opposite side of, and as an alternative to, the abutment of the second lever arm so that a corresponding third moment is exerted on the article having an opposite rotation to the second moment, and wherein the first and third moments together hold the article fixed relative to the tool so that the article is controllable with the handle.

10. The tool of claim 9, wherein the second and third lever arms are integrated as a socket surrounding the first lever arm to define a socket cavity therebetween, said socket having an open end adjacent the free end leading into the socket cavity, and an open-ended slot in communication with the open end and adapted to catch a neck portion of the article when inserting the first lever arm in the throughbore.

11. A tool system for controlling a pair of articles each having a throughbore, said tool system comprising:

a pair of handheld tools, each tool comprising:

an elongated lever handle;

an elongated first lever arm transversely extending from one end of the handle to a free end, said first lever arm adapted to be inserted into the throughbore of a selected one of said articles and leveraged by the handle in a plane defined therewith so that a corresponding first moment is exerted on the selected article; and means for limiting rotation of the first lever arm in the throughbore of the selected article so that turning the handle about a longitudinal axis of the first lever arm exerts a corresponding second moment on the selected article orthogonal to the first moment, wherein the first and second moments together hold the selected article fixed relative to the tool so that the selected article is controllable with the handle, and the pair of articles are simultaneously and independently controllable with the two handles.

12. The tool system of claim 11, wherein said pair of handheld tools are mirror images of each other adapted for left hand and right hand use.

13. The tool system of claim 11, wherein said means for limiting rotation of the first lever arm in the throughbore of the selected article comprises a second lever arm fixedly suspended alongside the first lever arm and adapted to be leveraged by the handle about the longitudinal axis of the first lever arm to abut against and thereby exert the second moment on the selected article.

14. The tool system of claim 13, wherein said means for limiting rotation of the first lever arm in the throughbore of the selected article further comprises a third lever arm fixedly suspended alongside the first lever arm and adapted to be leveraged by the handle about the longitudinal axis of the first lever arm to abut against the selected article at an opposite side of, and as an alternative to, the abutment of the second lever arm so that a corresponding third moment is exerted on the selected article having an opposite rotation to the second moment, and wherein the first and third moments together hold the selected article fixed relative to the tool so that the selected article is controllable with the handle, and the pair of articles are simultaneously controllable independent of each other with the respective handles of the pair of tools.

15. The tool system of claim 14, wherein the second and third lever arms are integrated as a socket surrounding the first lever arm to define a socket cavity therebetween, said socket having an open end adjacent the free end leading into the socket cavity, and an open-end slot in communication with the open end and adapted to catch a neck portion of the selected article when inserting the first lever arm in the throughbore.

* * * * *